US009492031B2

(12) United States Patent
Diaz

(10) Patent No.: US 9,492,031 B2
(45) Date of Patent: Nov. 15, 2016

(54) VERSATILE OUTDOOR OVEN AND GRILL

(71) Applicant: Pedro A. Diaz, San Antonio, TX (US)

(72) Inventor: Pedro A. Diaz, San Antonio, TX (US)

( * ) Notice: Subject to any disclaimer, the term of this patent is extended or adjusted under 35 U.S.C. 154(b) by 377 days.

(21) Appl. No.: 13/768,908

(22) Filed: Feb. 15, 2013

(65) Prior Publication Data

US 2013/0206016 A1 Aug. 15, 2013

Related U.S. Application Data

(60) Provisional application No. 61/599,329, filed on Feb. 15, 2012.

(51) Int. Cl.
*A47J 37/07* (2006.01)
*A47J 37/06* (2006.01)

(52) U.S. Cl.
CPC ............ *A47J 37/07* (2013.01); *A47J 37/0623* (2013.01); *A47J 37/0704* (2013.01)

(58) Field of Classification Search
CPC ... A47J 37/07; A47J 37/0704; A47J 37/0623
USPC ......... 99/339, 340, 448, 450, 482; 126/25 R, 126/9 R; 219/492, 494
See application file for complete search history.

(56) References Cited

U.S. PATENT DOCUMENTS

| 3,380,444 | A | * | 4/1968 | Stalker | A47J 37/0763 |
| | | | | | 126/25 R |
| 4,669,447 | A | * | 6/1987 | Kelly | 126/59.5 |
| 4,696,282 | A | * | 9/1987 | Incitti | F24B 1/202 |
| | | | | | 126/25 R |
| 5,195,423 | A | * | 3/1993 | Beller | 99/340 |
| 5,694,917 | A | * | 12/1997 | Giebel et al. | 126/41 R |
| 6,135,014 | A | * | 10/2000 | Chang | A47J 37/0763 |
| | | | | | 126/25 R |
| 2004/0014382 | A1 | * | 1/2004 | MacAulay | 442/23 |
| 2008/0141997 | A1 | * | 6/2008 | Druin | 126/39 BA |
| 2009/0145421 | A1 | | 6/2009 | Yufer | |
| 2012/0064216 | A1 | | 3/2012 | Cullen | |

* cited by examiner

*Primary Examiner* — Jianying Atkisson
(74) *Attorney, Agent, or Firm* — Taboada Law Firm, PLLC; John M. Taboada

(57) ABSTRACT

An apparatus for outdoor cooking comprising: a tray configured to receive a fuel source; a substantially rectangular prism oven chamber comprising: an insulated bottom plate; four insulated side walls coupled to the insulated bottom plate; an opening opposite the insulated bottom plate; an access panel formed from a portion of one of the insulated side walls; one or more magnets configured to keep closed the access panel; a grilling cover removably mounted to the tray, wherein the grilling cover comprises: a back wall; two side walls coupled to the back wall; and a lid hinged to the back wall; four legs coupled to each corner of the rectangular prism oven chamber; and four wheels coupled to the four legs; wherein the tray is removably mounted to the opening of the rectangular prism oven chamber. Other embodiments are described and claimed.

19 Claims, 20 Drawing Sheets

VERSATILE OUTDOOR OVEN AND GRILL

I. CROSS REFERENCE TO RELATED APPLICATIONS

This application claims the benefit of the filing date of U.S. Provisional Patent Application Ser. No. 61/599,329, filed on Feb. 15, 2012, entitled "Versatile Outdoor Oven and Grill," the entire disclosure of which is hereby incorporated by reference into the present disclosure.

II. BACKGROUND

The invention relates generally to the field of outdoor cooking. More particularly, the invention relates to a versatile outdoor charcoal or wood (charcoal/wood) oven and grill (oven/grill) that is capable of functioning as an oven and grill simultaneously or separately.

III. SUMMARY

In one respect, disclosed is an apparatus for outdoor cooking, comprising a grilling section coupled atop a charcoal/wood burning tray. Both the grilling section and the charcoal/wood burning tray are coupled atop an insulated oven chamber comprising insulated walls and an insulated front panel access door.

In another respect, disclosed is an apparatus for outdoor cooking, comprising a grilling section coupled atop a charcoal/wood burning tray. Both the grilling section and the charcoal/wood burning tray are coupled atop an insulated oven chamber comprising insulated walls, insulated bottom, and an insulated front panel access door, wherein the grilling section coupled atop a charcoal/wood burning tray may be rested upon a collapsible and portable table top. Thus allowing for the transportability of the grilling section.

In yet another respect, disclosed is an apparatus for outdoor cooking, comprising a tray configured to receive a fuel source; a substantially rectangular prism oven chamber comprising: an insulated bottom plate; four insulated side walls coupled to the insulated bottom plate; and an opening opposite the insulated bottom plate; wherein the tray is removably mounted to an opening of the substantially rectangular prism oven chamber opposite the insulated bottom plate of the substantially rectangular prism oven chamber.

In yet another respect, disclosed is an apparatus for outdoor cooking, comprising a tray configured to receive a fuel source, wherein the tray comprises blackened steel or painted black steel; a substantially rectangular prism oven chamber comprising: an insulated bottom plate, wherein the insulated bottom plate comprises: a bottom stainless steel plate, wherein the bottom stainless steel plate faces the interior of the substantially rectangular prism oven chamber; a bottom insulation layer coupled to the bottom stainless steel plate; a bottom aluminum plate coupled to the bottom insulation layer; and a valve coupled through the insulated bottom plate; four insulated side walls coupled to the insulated bottom plate, wherein the four insulated side walls comprise: a wall stainless steel plate, wherein the wall stainless steel plate faces the interior of the substantially rectangular prism oven chamber; a wall insulation layer coupled to the wall stainless steel plate; and a wall aluminum plate coupled to the wall insulation layer; an opening opposite the insulated bottom plate; an access panel formed from a portion of one of the insulated side walls, wherein the access panel is hinged along an edge of the substantially rectangular prism oven chamber between one of the insulated side walls and the insulated bottom plate; one or more magnets configured to keep closed the access panel; a grate disposed within the substantially rectangular prism oven chamber; and an oven thermometer coupled through one of the four insulated side walls; a grilling cover removably mounted to the tray, wherein the grilling cover comprises: a back wall; two side walls coupled to the back wall, wherein at least one of the side walls has at least one or more vent openings; a grill grate removably coupled to the two side walls; and a lid hinged to the back wall; four legs coupled to each corner of the substantially rectangular prism oven chamber on the side of the insulated bottom plate; and four wheels coupled to the four legs opposite each corner of the substantially rectangular prism oven chamber, wherein two of the four wheels comprise rotating casters and wherein at least one of the four wheels comprises a brake; wherein the tray is removably mounted to the opening of the substantially rectangular prism oven chamber opposite the insulated bottom plate of the substantially rectangular prism oven chamber.

Numerous additional embodiments are also possible.

IV. BRIEF DESCRIPTION OF THE DRAWINGS

Other objects and advantages of the invention may become apparent upon reading the detailed description and upon reference to the accompanying drawings.

Figure 9A:
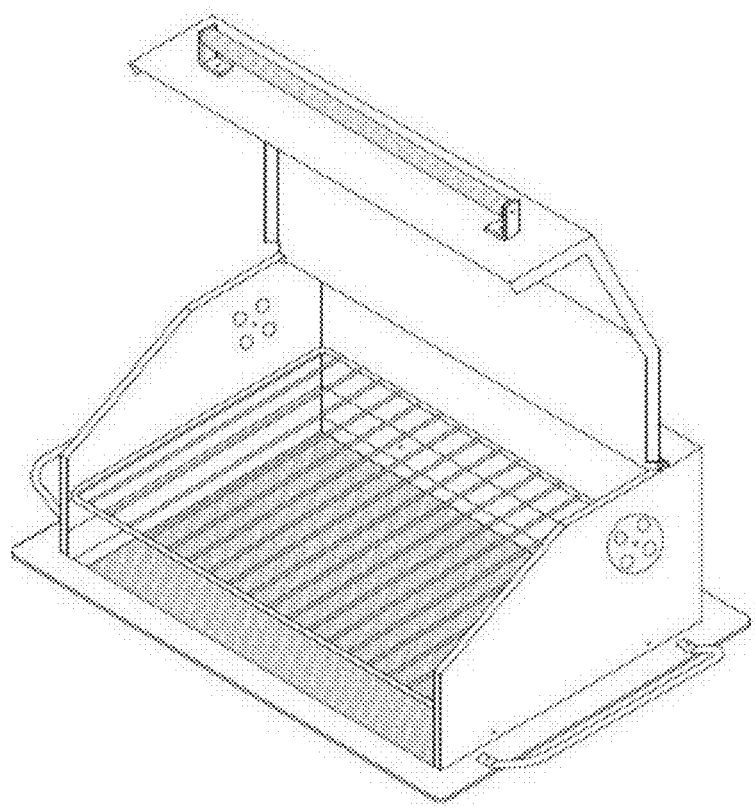
Figure 9B:
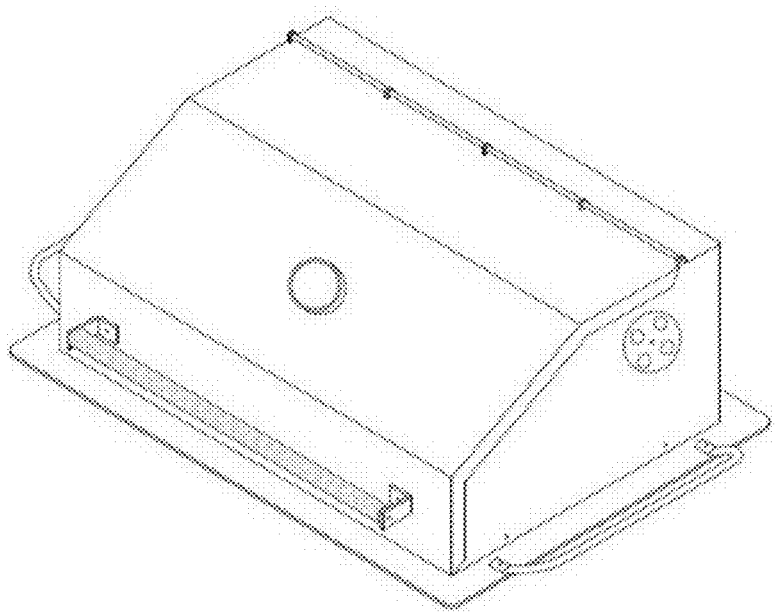

FIGS. 9A and B are isometric illustrations of the grill portion attached to the charcoal/wood burning tray with the top cover in the open position and with the top cover in the closed position, respectively, in accordance with some embodiments.

Figure 10:
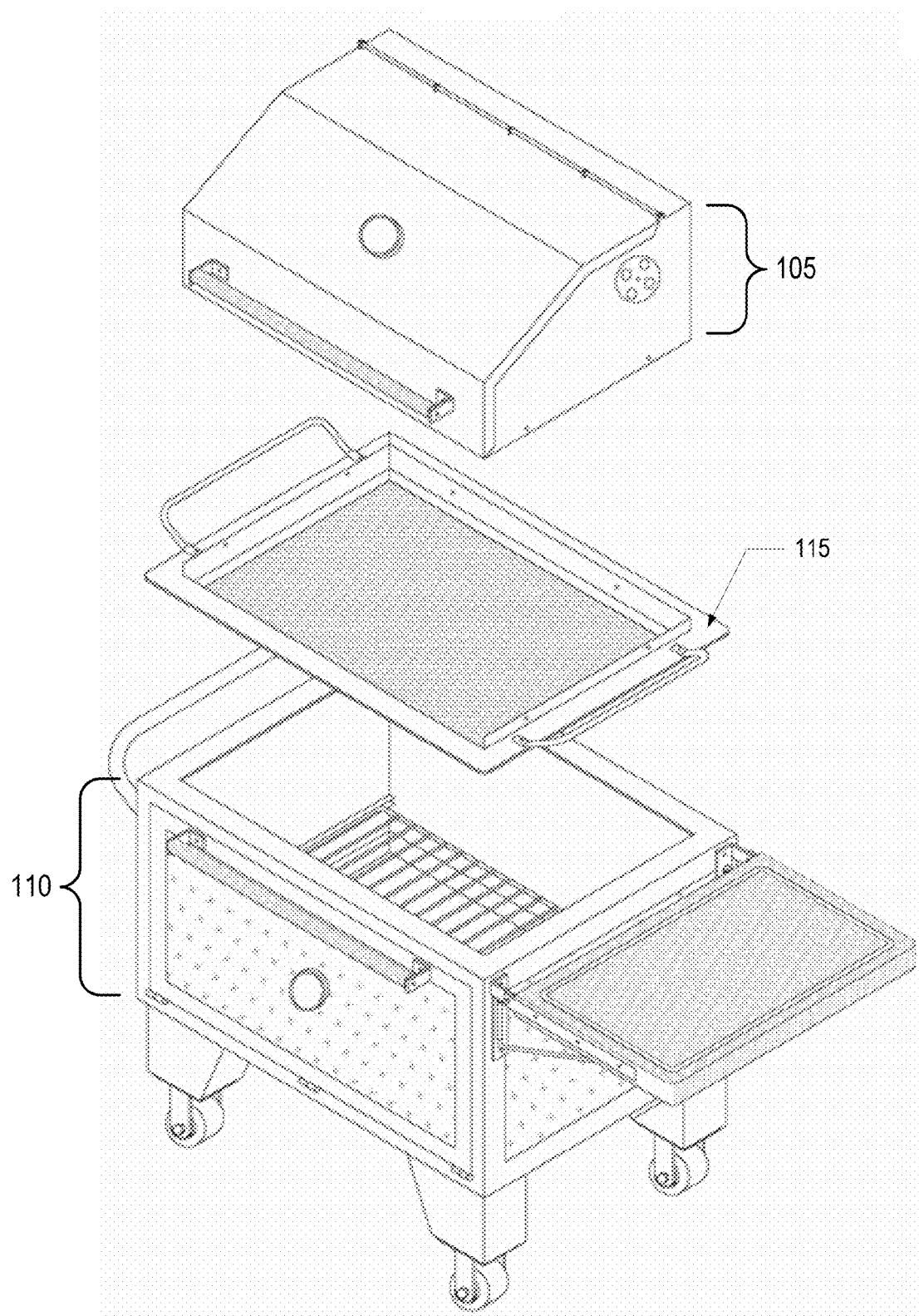

FIG. 10 is an exploded isometric illustration of the outdoor charcoal/wood oven/grill with the grill portion, the charcoal/wood burning tray, and the oven portion all separated from each other, in accordance with some embodiments.

Figure 11:
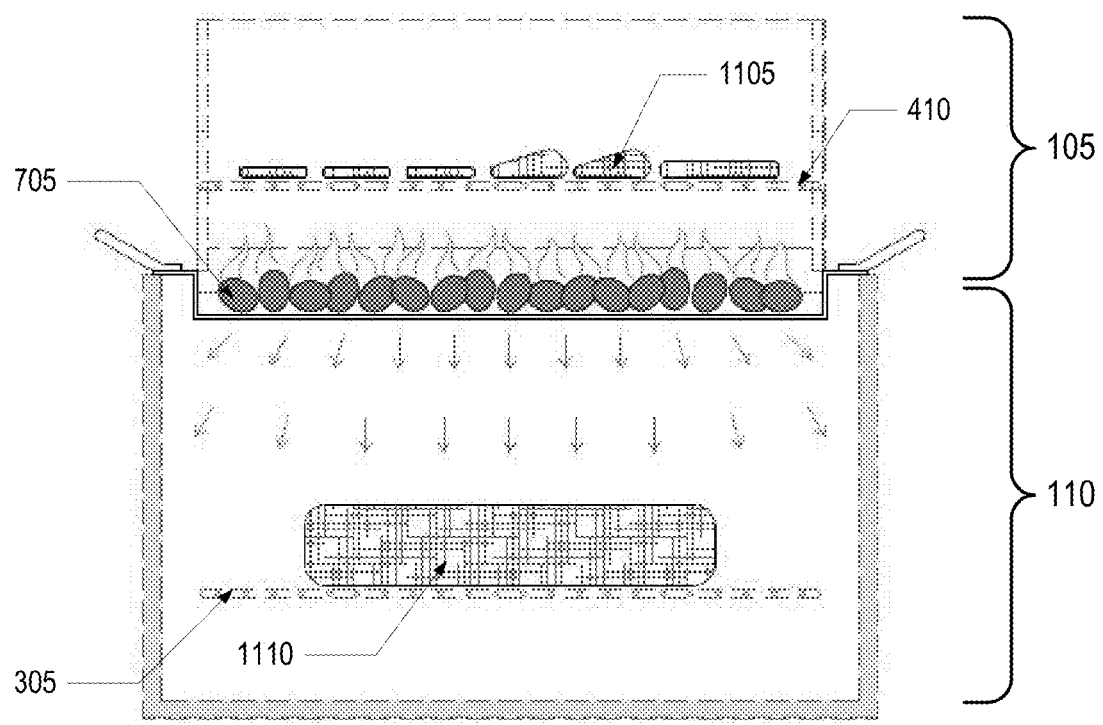

FIG. 11 is a cross-cut illustration of the outdoor charcoal/wood oven/grill with lit charcoals in the charcoal/wood burning tray, food on the grill grate, and food on the oven grate, in accordance with some embodiments.

Figure 12A:
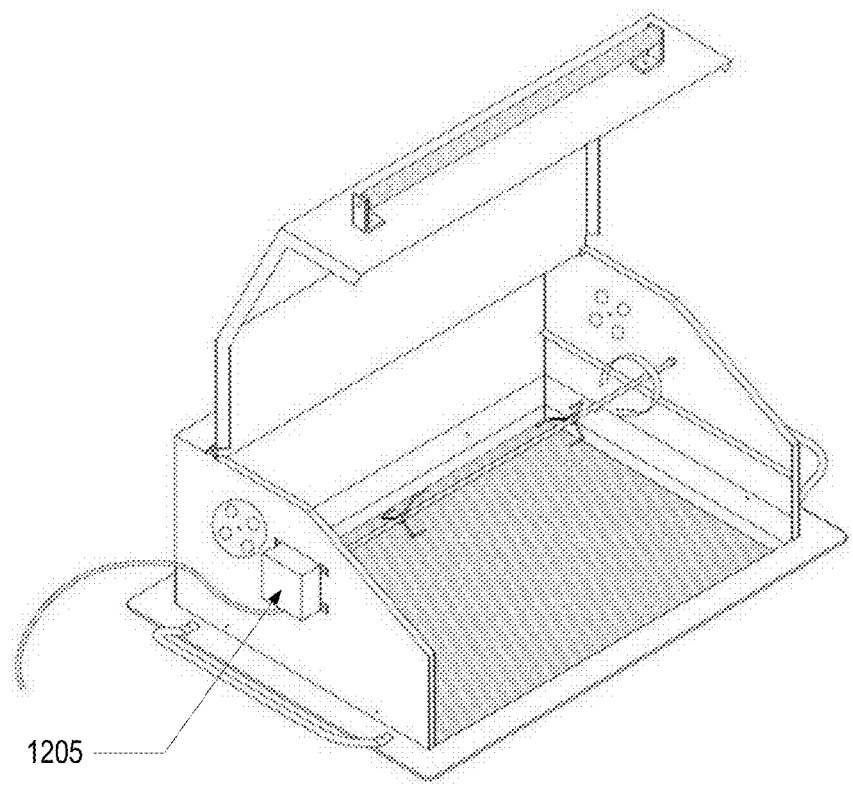
Figure 12B:
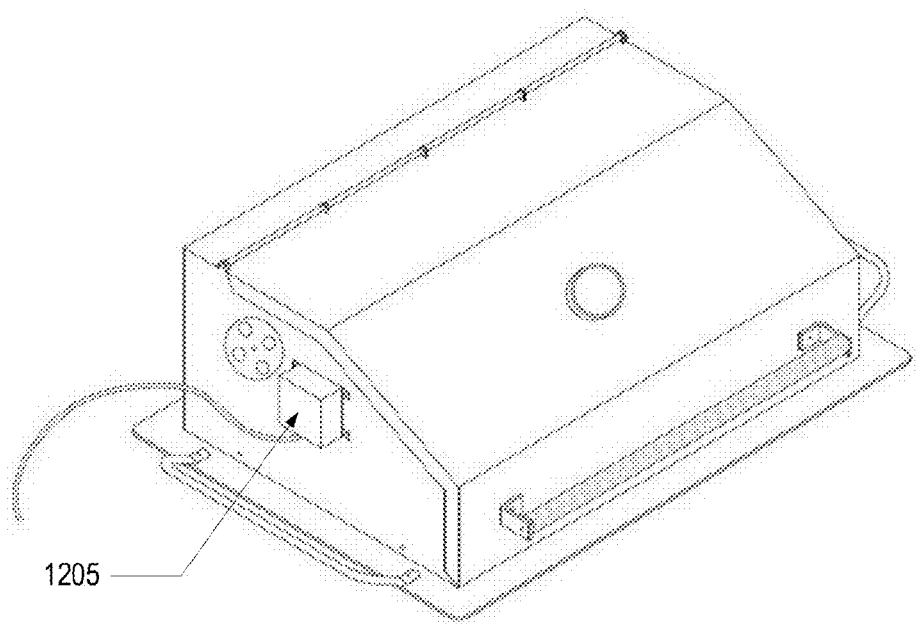

FIGS. 12A and B are isometric illustrations of the outdoor charcoal/wood oven/grill with an installed A/C powered rotisserie accessory in the grill portion with the top cover in the open position and with the top cover in the closed position, respectively, in accordance with some embodiments.

Figure 13A:
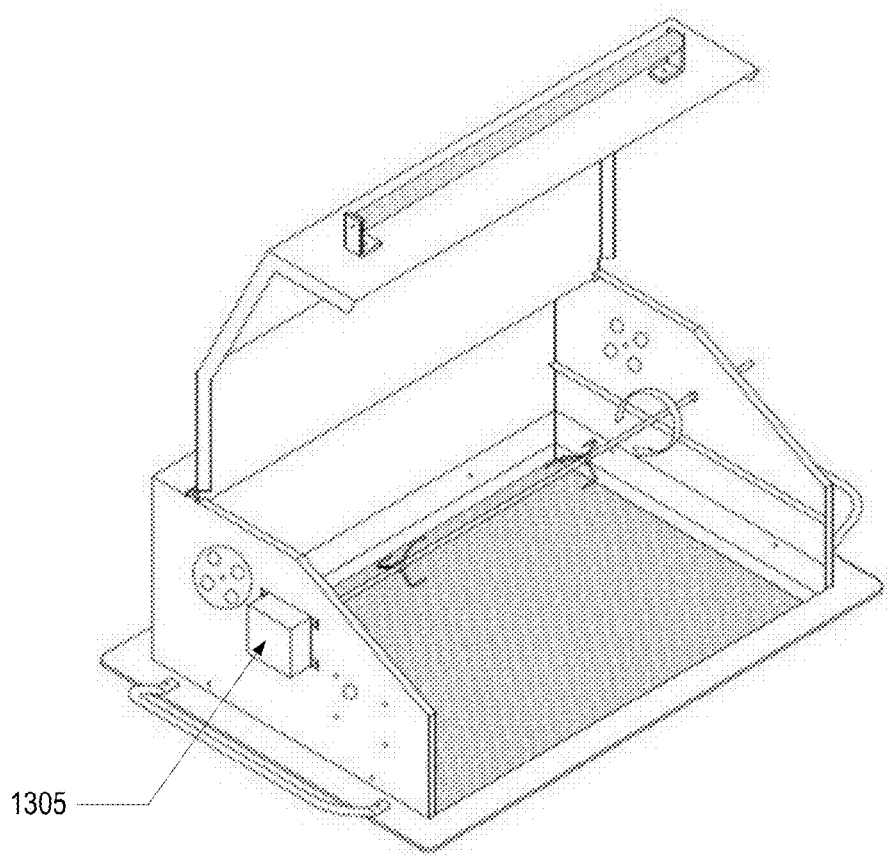
Figure 13B:
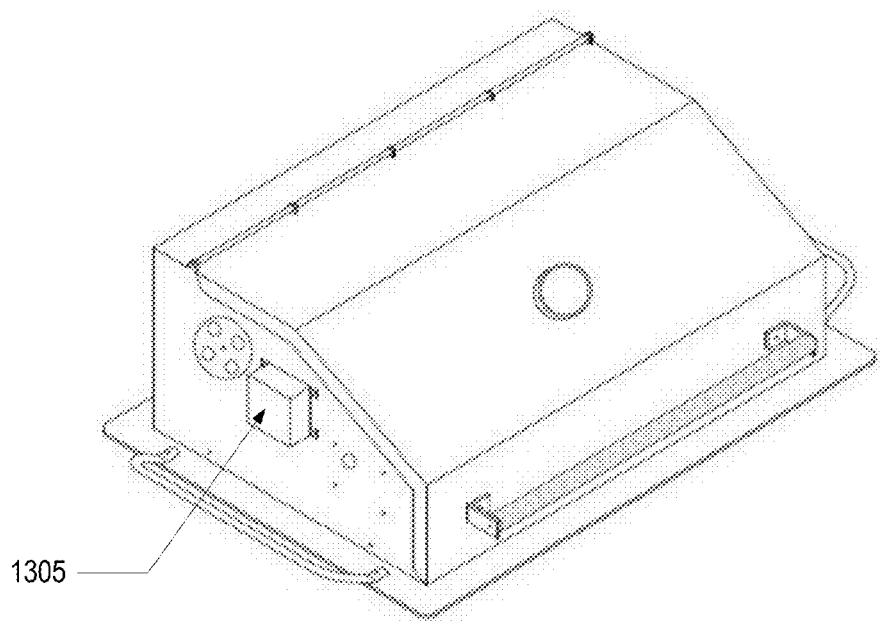

FIGS. 13A and B are isometric illustrations of the outdoor charcoal/wood oven/grill with an installed D/C powered rotisserie accessory in the grill portion with the top cover in the open position and with the top cover in the closed position, respectively, in accordance with some embodiments.

Figure 14A:
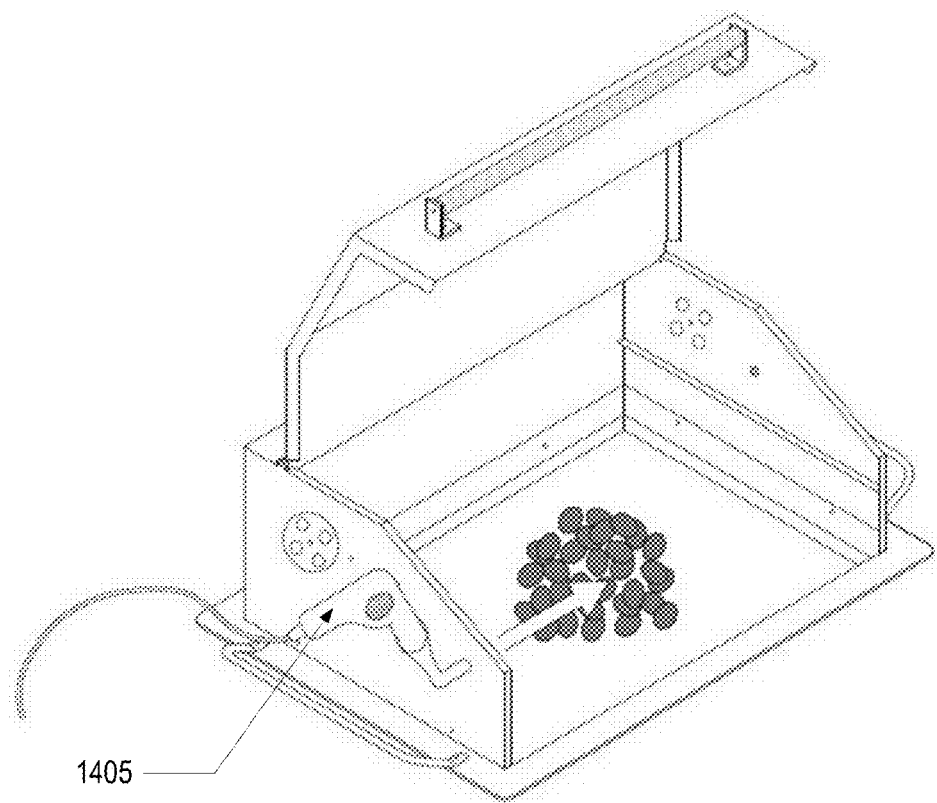
Figure 14B:
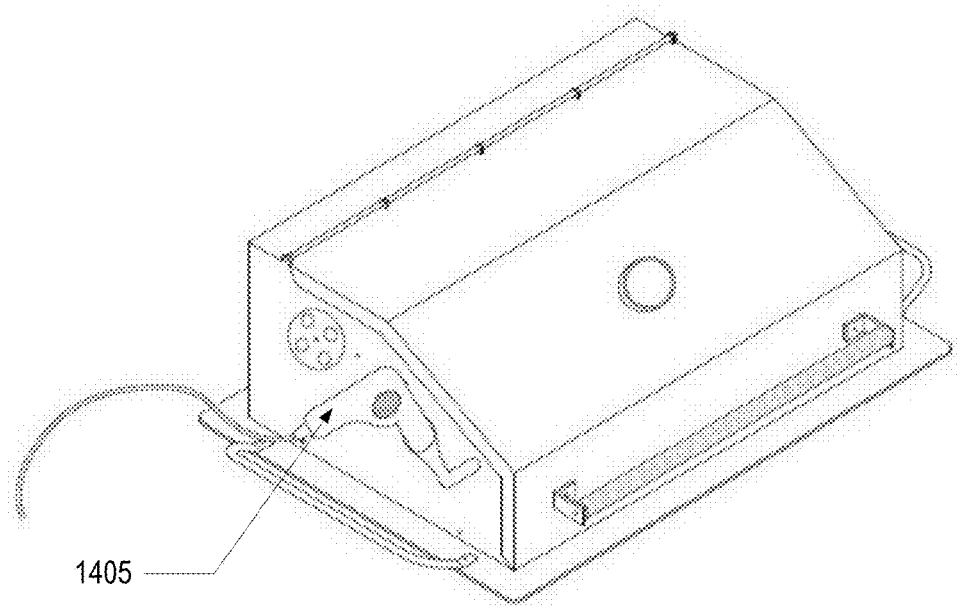

FIGS. 14A and B are isometric illustrations of the outdoor charcoal/wood oven/grill with an installed A/C powered air blower accessory attached to the grill portion with the top cover in the open position and with the top cover in the closed position, respectively, in accordance with some embodiments.

Figure 15A:
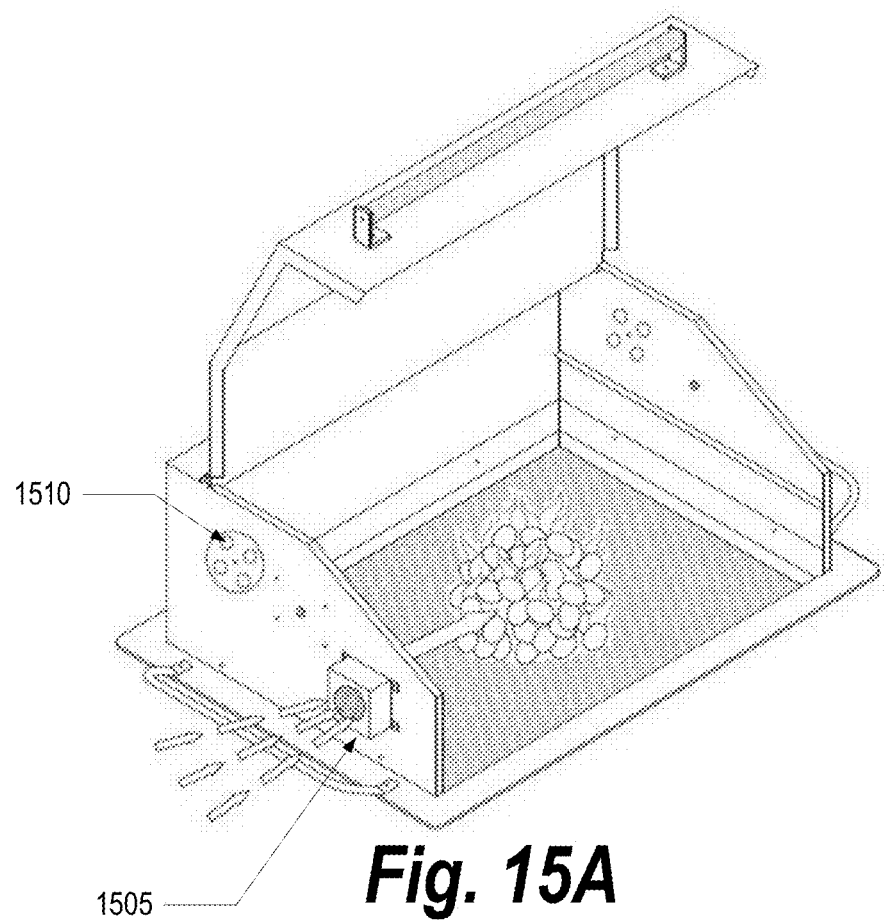
Figure 15B:
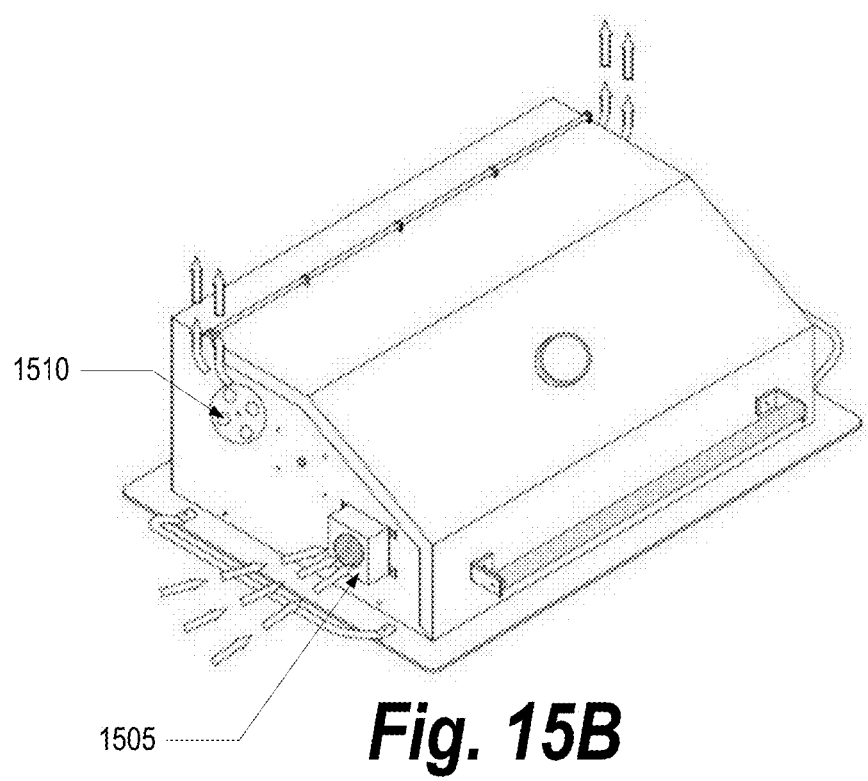

FIGS. 15A and B are isometric illustrations of the outdoor charcoal/wood oven/grill with an installed D/C powered air blower accessory attached to the grill portion with the top cover in the open position and with the top cover in the closed position, respectively, in accordance with some embodiments.

Figure 16:
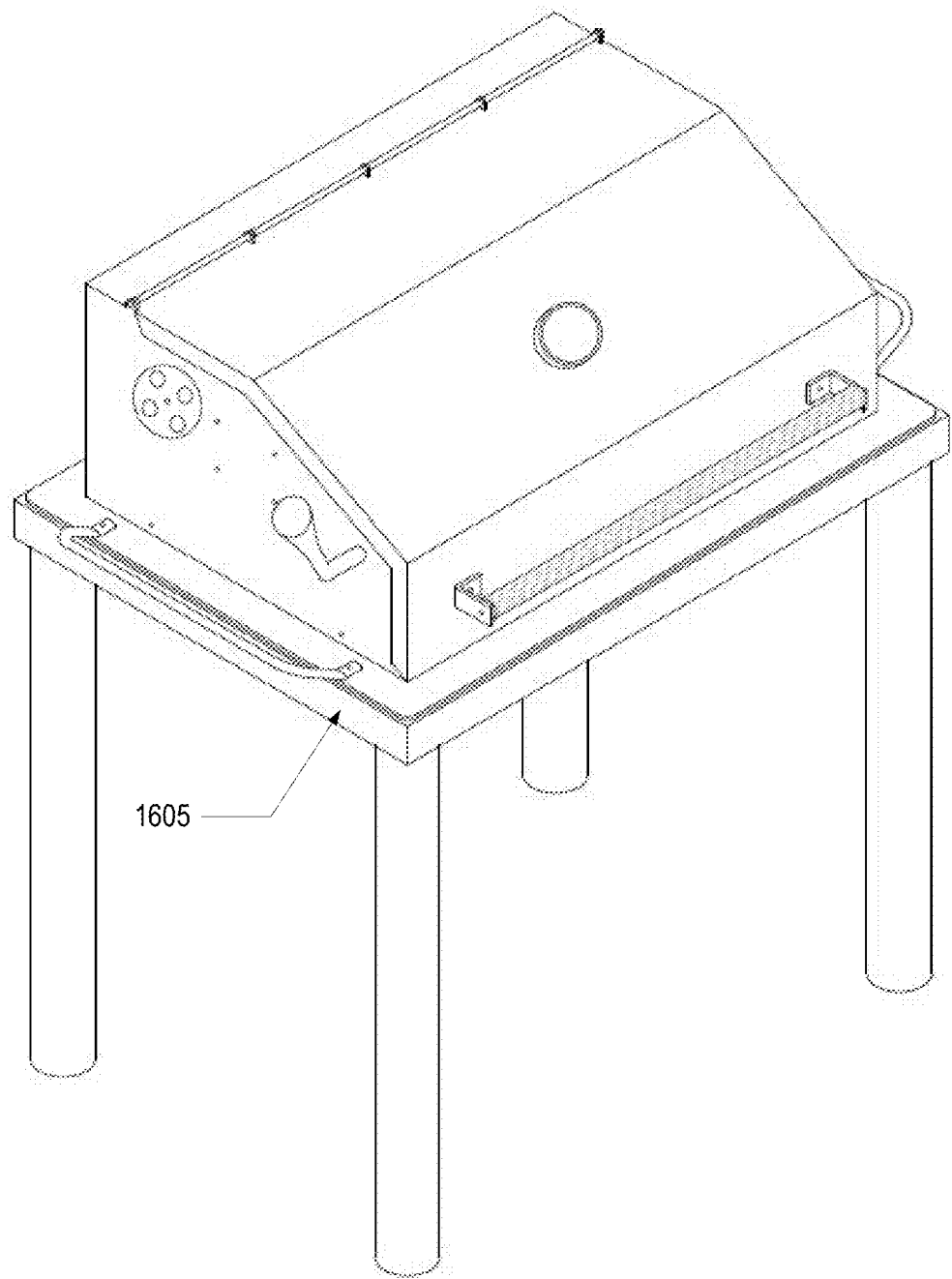

FIG. 16 is an isometric illustration of the outdoor charcoal/wood oven/grill with the charcoal/wood burning tray and grill portion sitting on a support frame, in accordance with some embodiments.

Figure 17:
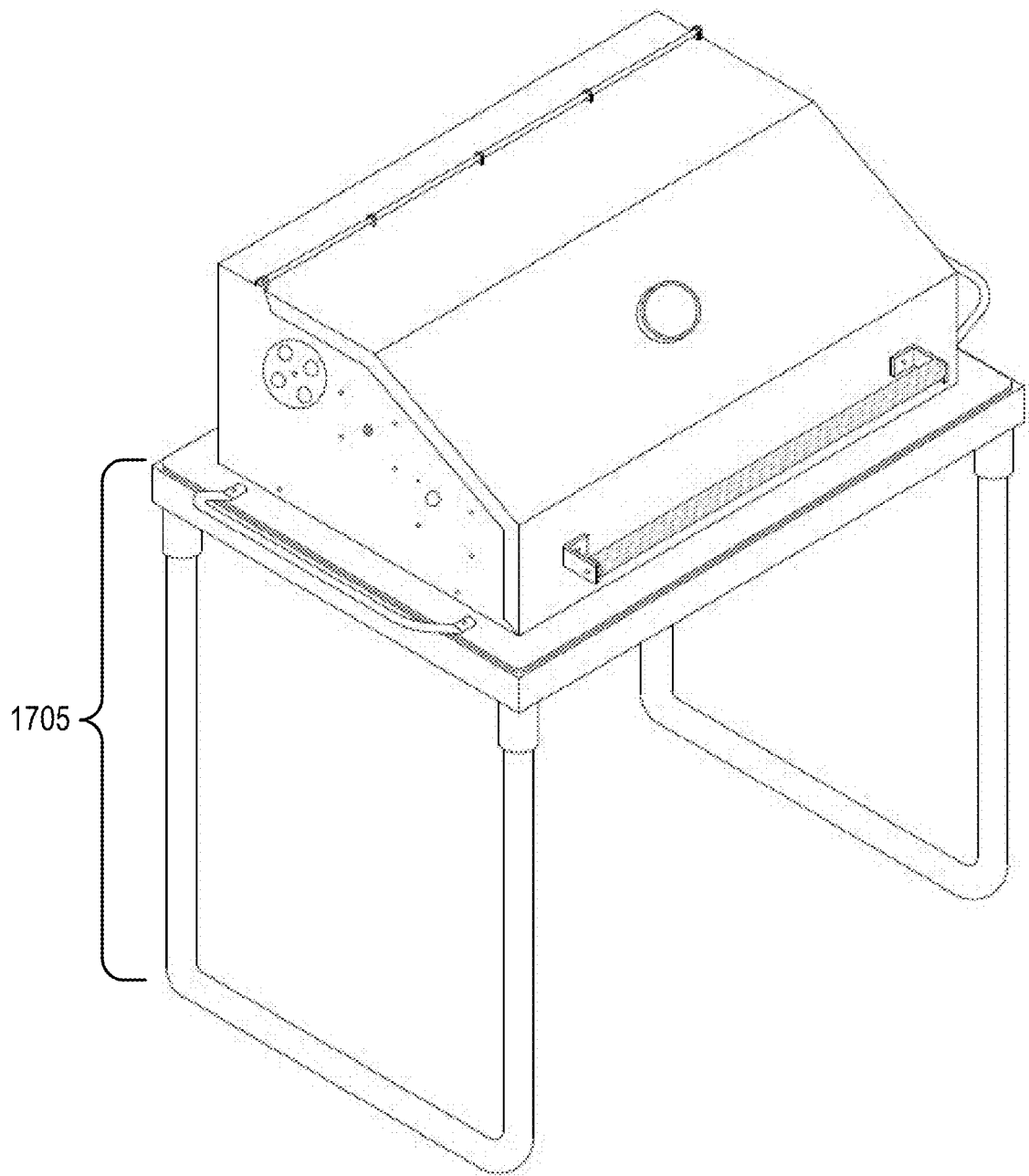

FIG. 17 is an isometric illustration of the outdoor charcoal/wood oven/grill with the charcoal/wood burning tray and grill portion sitting on a collapsible and portable support frame, in accordance with some embodiments.

Figure 18:
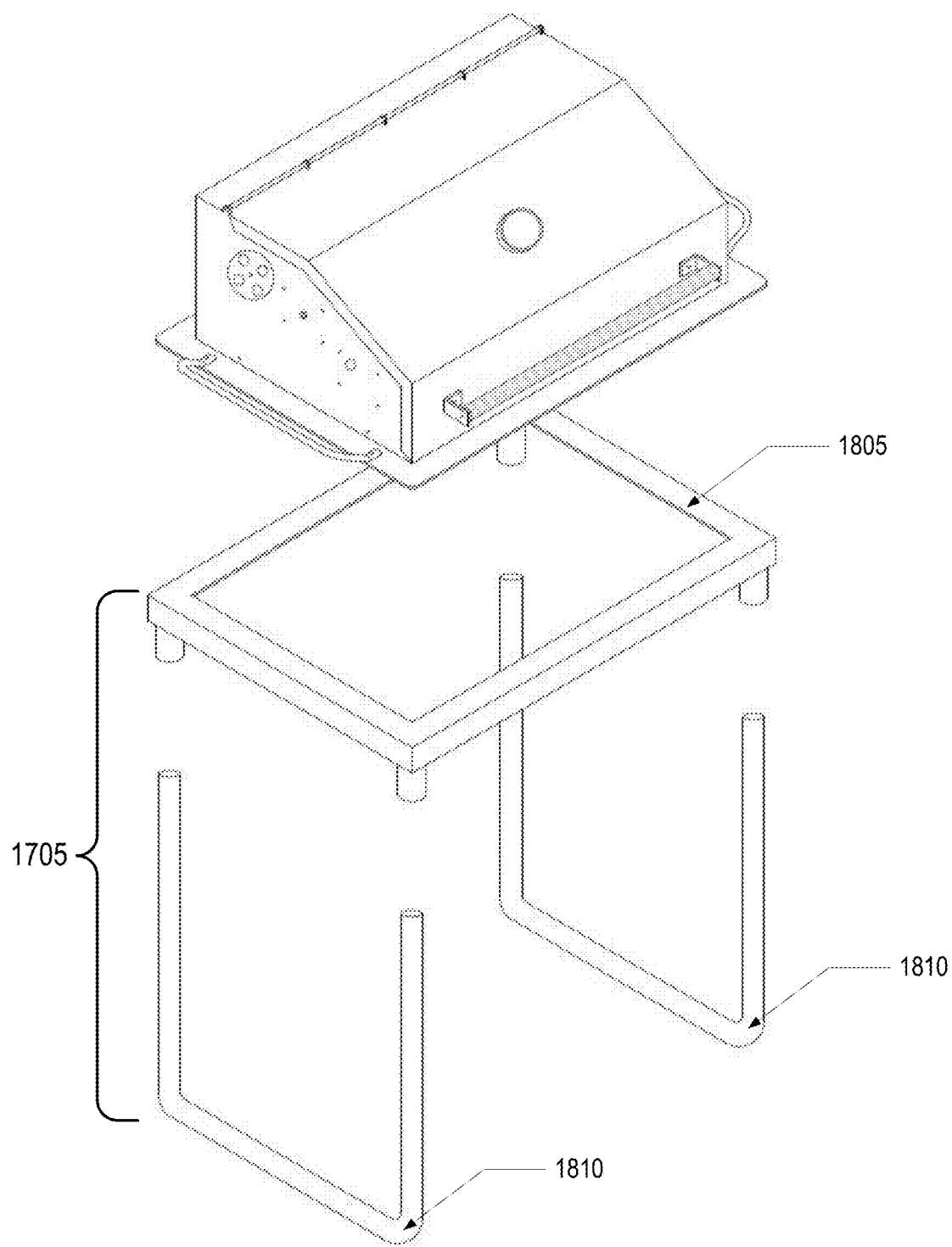

FIG. 18 is an exploded isometric illustration of the outdoor charcoal/wood oven/grill with the charcoal/wood burning tray and grill portion and a collapsible and portable support frame, in accordance with some embodiments.

Figure 19:
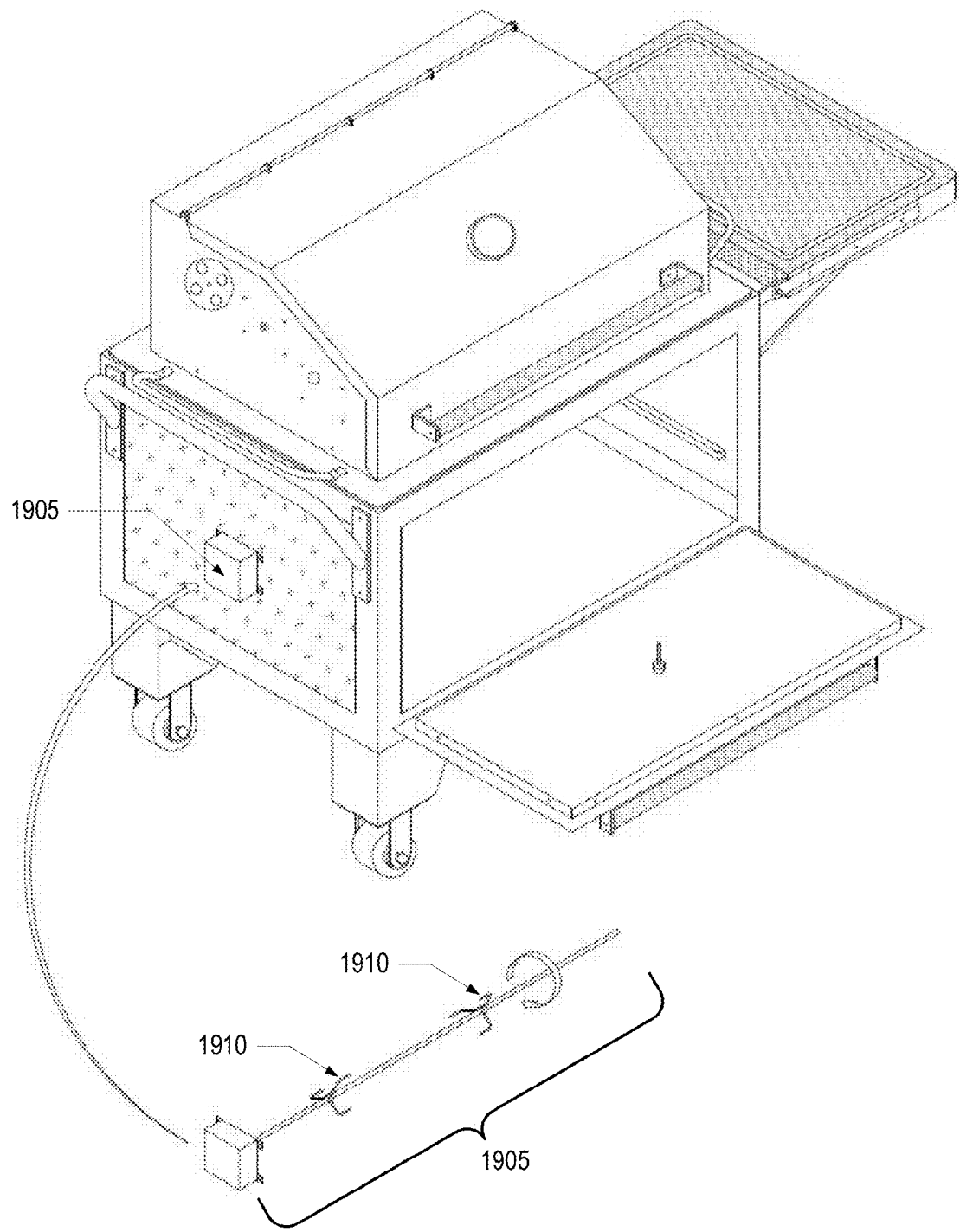

FIG. 19 is an isometric illustration of the outdoor charcoal/wood oven/grill with an installed D/C powered rotisserie accessory in the oven portion with the front access panel of the oven in the open position, in accordance with some embodiments.

Figure 20:
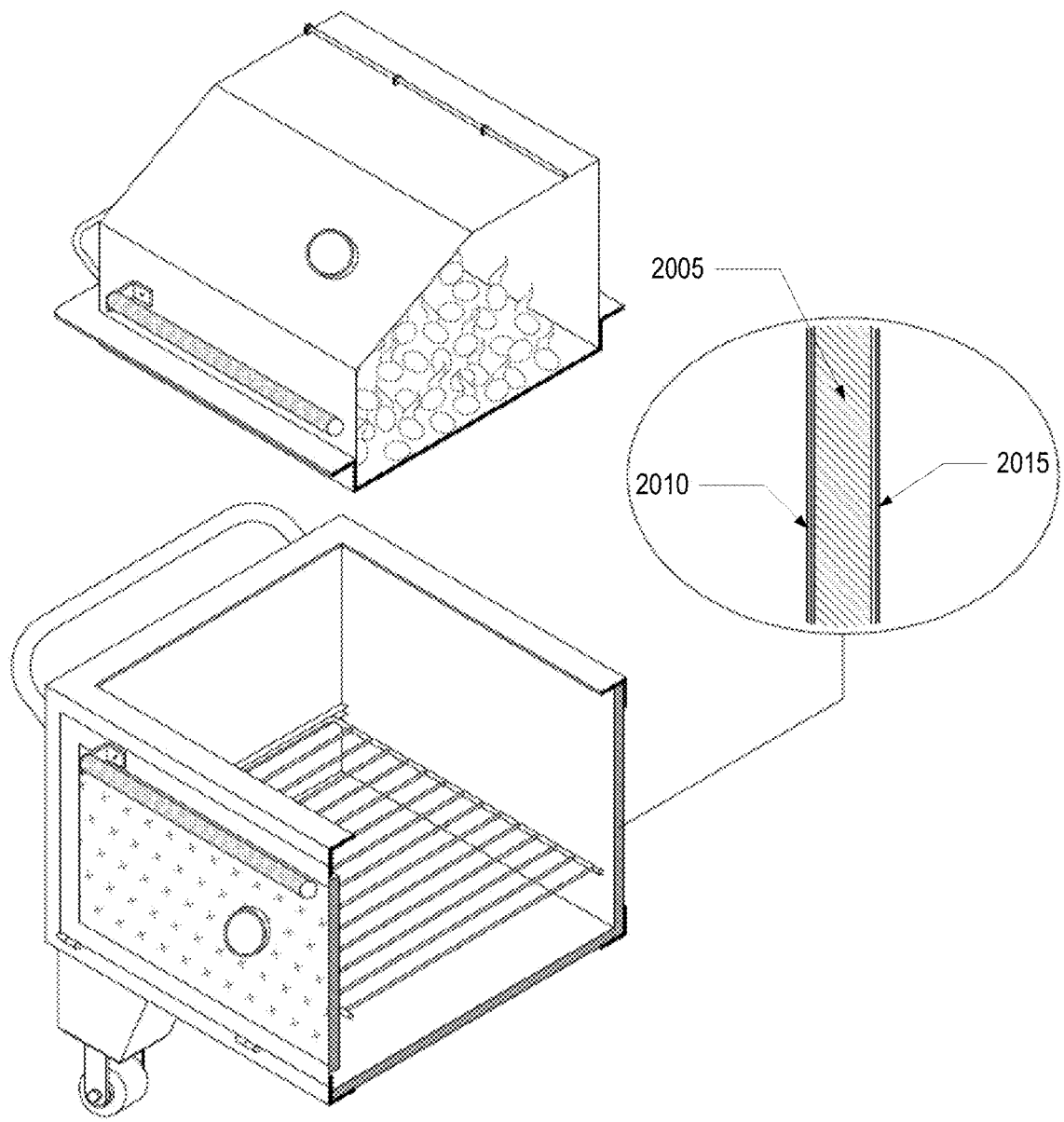

FIG. 20 is an isometric illustration of the outdoor charcoal/wood oven/grill showing the cross-sectional cut of one of the walls of the oven, in accordance with some embodiments.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

V. DETAILED DESCRIPTION

One or more embodiments of the invention are described below. It should be noted that these and any other embodiments are exemplary and are intended to be illustrative of the invention rather than limiting. While the invention is widely applicable to different types of systems, it is impossible to include all of the possible embodiments and contexts of the invention in this disclosure. Upon reading this disclosure, many alternative embodiments of the present invention will be apparent to persons of ordinary skill in the art.

Outdoor roasting devices such as La Caja China from Medley, Fla. and Al Simon's Cajun Microwaves from Breaux Bridge, La. are conventional roasting boxes that allow for radiant indirect cooking of the food. Unfortunately, neither of the devices offers easy access to the food being cooked since the lit charcoal or wood first have to be removed in order to get access. Not only is this potentially very dangerous, it is also very time consuming process that requires more than one person. Additionally, when the charcoal or wood is removed from the top of the roasting box, a majority of the heat that was trapped in the roasting box quickly escapes from the top side opening, thus making it a challenge to maintain a substantially constant temperature within the roasting box during the processes of inspecting or tending to the food.

The cooking grill disclosed by Thomas Cullen in US Patent Application 2012/0064216 mentions that the food rack is slidably installed within the body of the grill through at least one opening in one of the sidewalls of the grill body. Cullen's cooking grill does not disclose the materials or the design for optimized heat and energy retention into the grill. What is needed is a device with quick and accurate temperature attainment in the oven chamber with easy single person user access to the food being cooked. The embodiment or embodiments described herein may solve these shortcomings as well as others by proposing a novel outdoor oven and grill that is capable of quickly attaining and maintaining a substantially stable temperature in an oven portion as well as providing a grilling portion.

Figure 1:
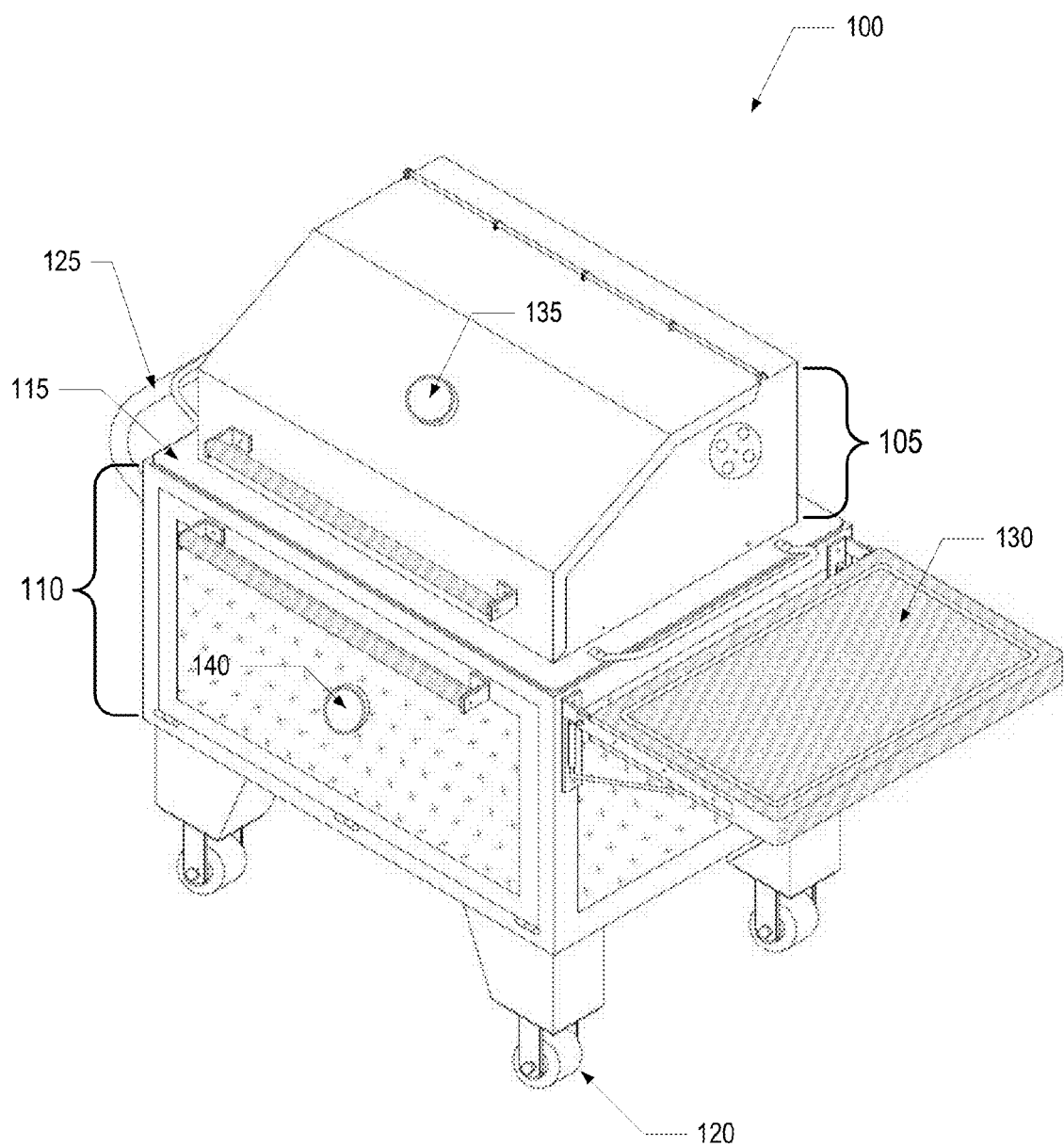
FIG. 1 is an isometric illustration of the outdoor charcoal/wood oven/grill, in accordance with some embodiments.

FIG. 1 is an isometric illustration of the outdoor charcoal/wood oven/grill, in accordance with some embodiments.

In some embodiments, the versatile outdoor charcoal or wood oven and grill 100 comprises an upper grilling chamber 105 removably mounted to a charcoal/wood burning tray 115 which is removably mounted to a lower insulated oven chamber 110, substantially in the shape of a rectangular prism. The charcoal/wood burning tray 115 provides the heating source for both the grilling chamber 105 and the insulated oven chamber 110. The charcoal/wood burning tray 115 provides direct heat to the upper grilling chamber 105 while at the same time providing indirect radiant heat to the lower insulated oven chamber 110. In some embodiments the upper grill chamber comprises steel plate or sheet. In some embodiments, the charcoal/wood burning tray 115 comprises steel blackened or painted black to maximize the amount of energy that is absorbed by the burning charcoal or wood and transferred to the oven chamber 110 as radiant energy. In yet other embodiments, the charcoal/wood burning tray 115 comprises a copper layer encased within the portion of the steel substantially over all the area where the charcoal or wood sits and improves the temperature distribution uniformity of the charcoal/wood burning tray 115. Additionally, the walls and bottom panel of the oven chamber 110 are insulated. Hence, when there is a lit heat source in the charcoal/wood burning tray 115, the oven chamber 110 will maintain a temperature in the range between 175 to 600 degrees Fahrenheit depending on the amount of charcoal or wood that is burning in the charcoal/wood burning tray 115. In some embodiments, the temperature is maintained between 350 to 400 degrees Fahrenheit. In some embodiments, the interior of the oven chamber is lined with polished stainless steel sheet or plate to maximize the amount of radiant energy reflected from the walls, bottom, and lid of the insulated oven chamber 110. The stainless steel lining helps to minimize the amount of infrared energy that is absorbed by the walls and bottom of the lower oven chamber. The lower oven chamber 110 has a hinged front access panel that provides easy access to the oven without having to remove the charcoal/wood burning tray from the apparatus. The oven/grill 100 may also be easily moved around as it sits on wheels 120. One or more of the wheels may also have an integrated brake which locks the wheel from moving. In some embodiments, the two wheels on the side of the lift/push bar 125 are freely rotating caster wheels which permit movement in two dimensions and the two wheels on the opposite side of the lift/push bar 125 are wheels which only rotate along a line. In other embodiments, all four wheels are freely rotating caster wheels which allow the easy movement of the grill in two dimensions. In yet another alternative, below the lift/push bar 125 the wheels would be replaced with fixed, non-wheeled posts and the two wheels on the side opposite lift/push bar would be the wheeled, either freely rotating caster wheels or standard wheels. The oven/grill 100 may also have a wooden cutting board 130 that is capable of being folded flat against the side wall of the oven chamber 110. The wooden cutting board 130 is also capable of being easily and quickly removed from the oven/grill 100 for washing and cleaning. The oven/grill 100 also has a grill thermometer 135 for the grilling chamber 105 and an oven thermometer 140 for the oven chamber 110. The oven/grill 100 also has a drain port at the bottom of the oven chamber 110 in order to facilitate the removal of the grease created from cooking the food in the oven chamber 110. The drain port also makes the cleaning of the oven chamber 110 easier since the cleaner may also be removed through the drain port.

Figure 2:
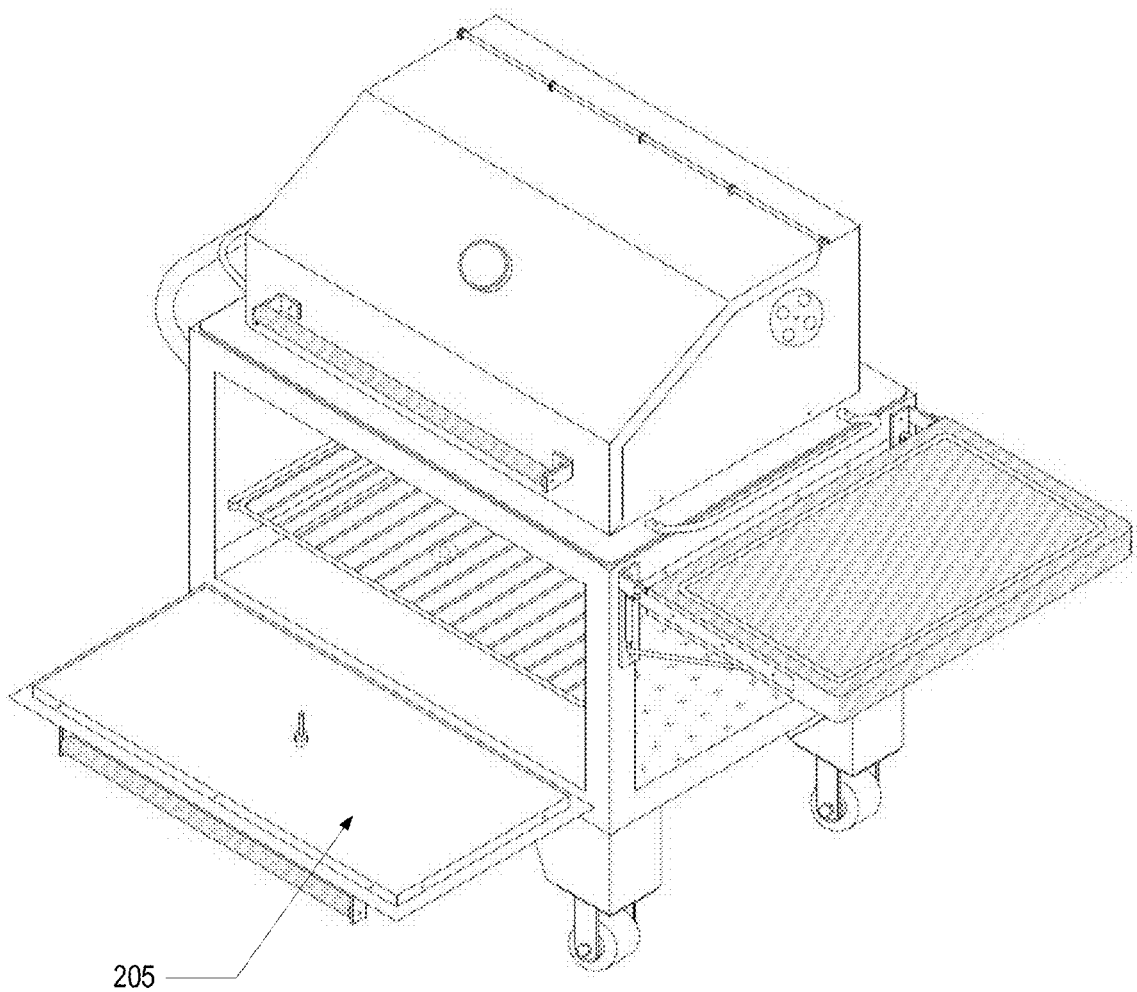
FIG. 2 is an isometric illustration of the outdoor charcoal/wood oven/grill with the front access panel of the oven in the open position, in accordance with some embodiments.

FIG. 2 is an isometric illustration of the outdoor charcoal/wood oven/grill with the front access panel of the oven in the open position, in accordance with some embodiments.

In some embodiments, a hinged front access panel 205 provides easy access to the oven chamber without having to remove the charcoal/wood burning tray. The other outdoor roasting devices such as La Caja China from Medley, Fla. and Al Simon's Cajun Microwaves from Breaux Bridge, La. do not have the capability of sliding the food out of the cooking oven since all the walls of those devices are fixed. Not only is it time consuming to have to remove the charcoal/wood tray from the device in order to check on or rotate the food being cooked in the oven, it is also a dangerous procedure that requires more than one person.

Figure 3:
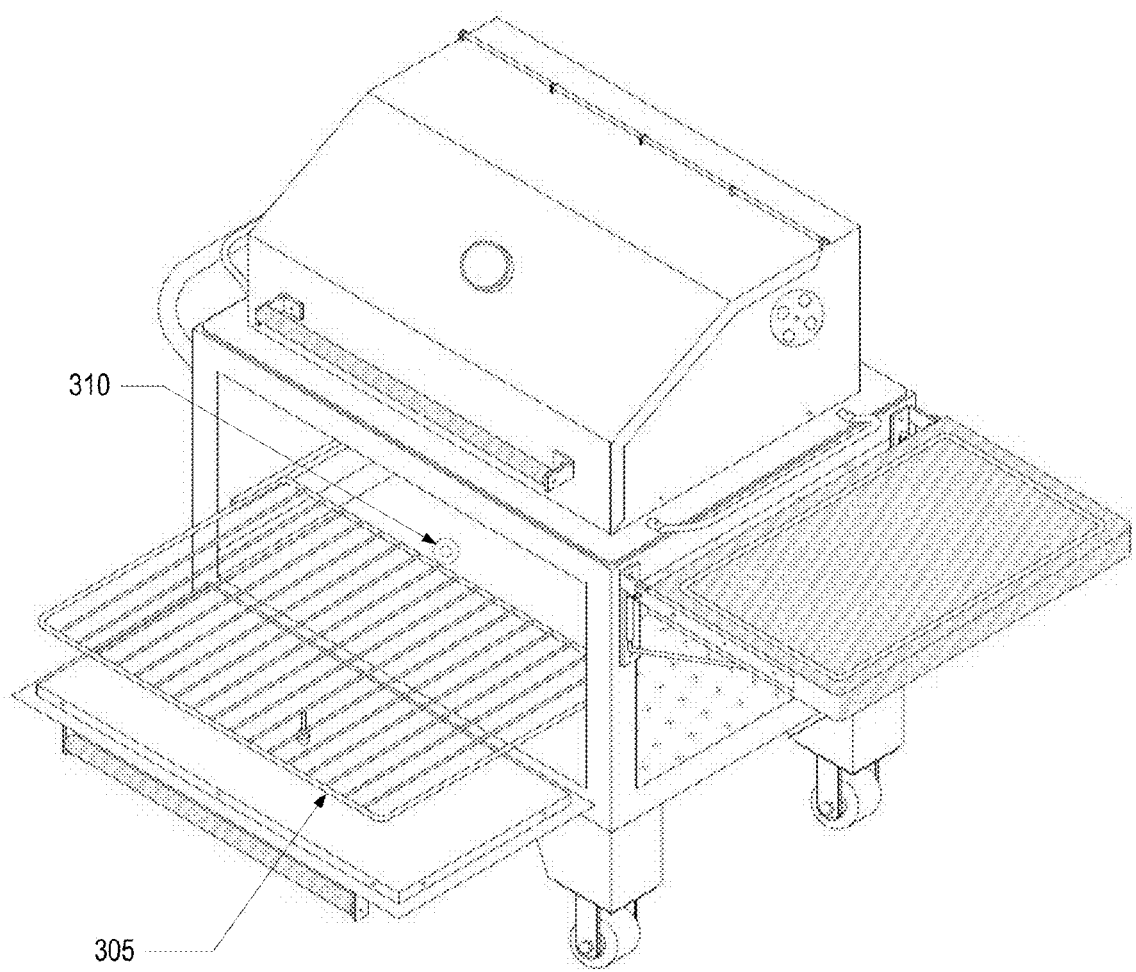
FIG. 3 is an isometric illustration of the outdoor charcoal/wood oven/grill with the front access panel to the oven in the open position and the oven grate extended out of the oven/grill, in accordance with some embodiments.

FIG. 3 is an isometric illustration of the outdoor charcoal/wood oven/grill with the front access panel to the oven in the open position and the oven grate extended out of the oven/grill, in accordance with some embodiments.

In some embodiments, the oven grate 305 is designed to be extended out to facilitate the loading and unloading of the food items to be cooked. In the alternative, the grate may comprise a closed cage structure where food is placed into. The cage structure may be pulled out slightly out of the oven and subsequently rotated 180 degrees along an axis parallel to the hinge access of the front access panel. The rotatable cage structure gives the user the ability to flip the portion of the food that is closest to the charcoal/wood burning tray heat source. Additionally, the bottom of the oven chamber has a port 310 where grease, water, and any other cleaning product may be drained from the oven grill.

Figure 4:
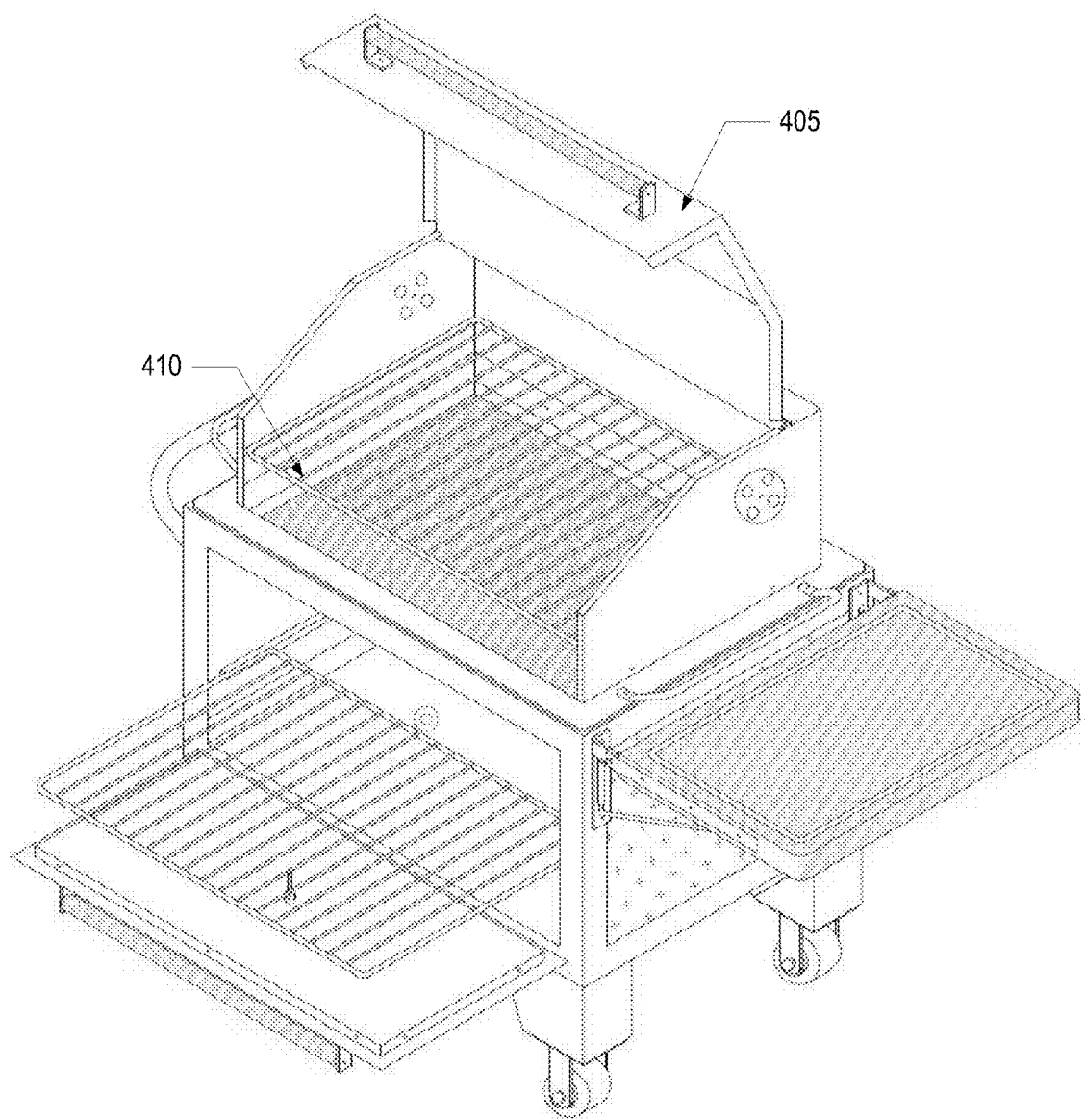
FIG. 4 is an isometric illustration of the outdoor charcoal/wood oven/grill with the front access panel to the oven in the open position, the oven grate extended out of the oven/grill, and the top cover to the grill in the open position, in accordance with some embodiments.

FIG. 4 is an isometric illustration of the outdoor charcoal/wood oven/grill with the front access panel to the oven in the open position, the oven grate extended out of the oven/grill, and the top cover to the grill in the open position, in accordance with some embodiments.

In some embodiments, the top lid 405 opens up to allow easy access to the food items being grilled. The grilling chamber also has a removable grill grate 410 where food items are placed for grilling.

Figure 5:
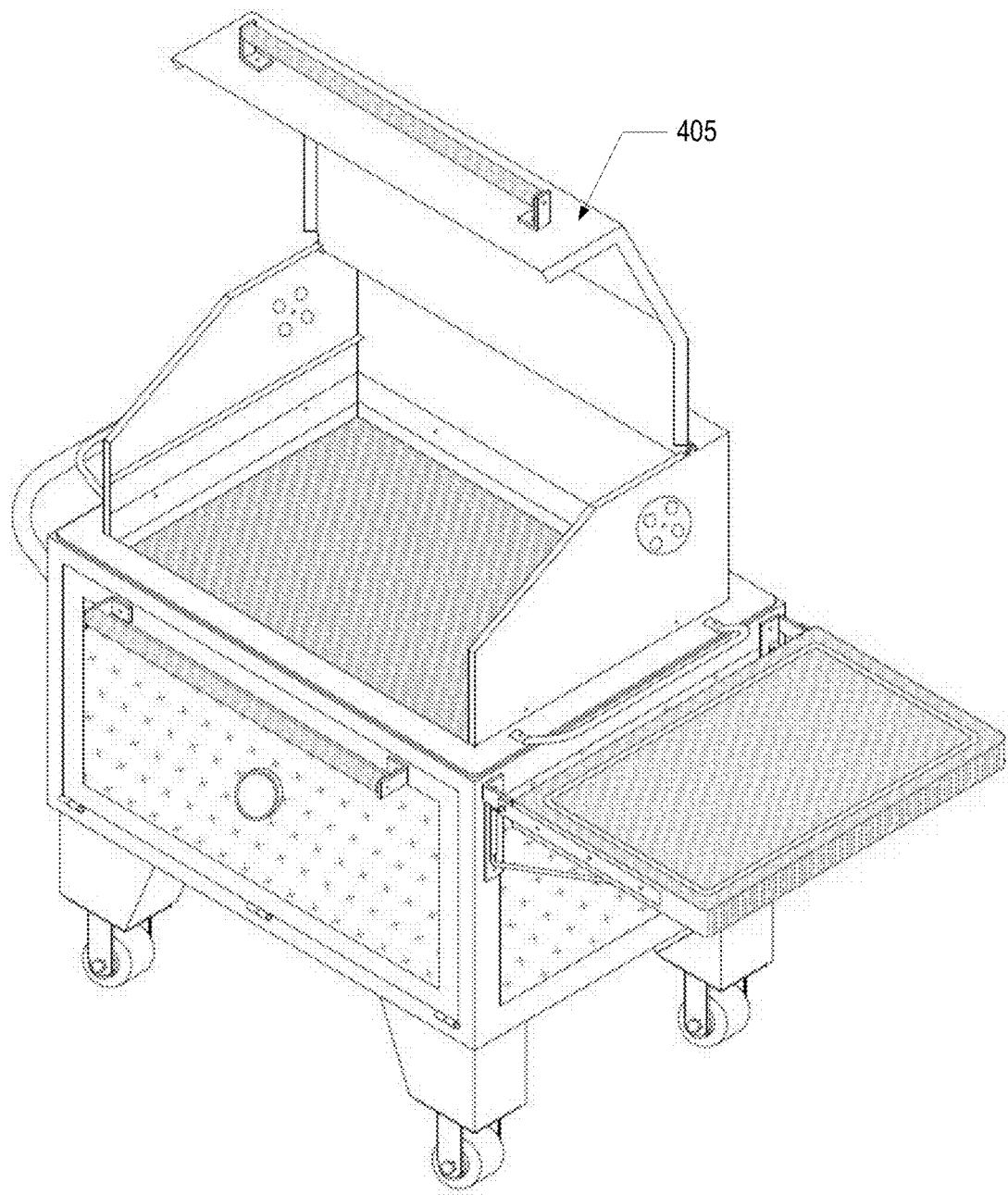
FIG. 5 is an isometric illustration of the outdoor charcoal/wood oven/grill with the top cover to the grill in the open position and the grill grate removed from the grill, in accordance with some embodiments.

FIG. 5 is an isometric illustration of the outdoor charcoal/wood oven/grill with the top cover to the grill in the open position and the grill grate removed from the grill, in accordance with some embodiments.

In some embodiments, the grill grate is designed to be removed from the grill portion in order to provide easy access to the charcoal and wood in the charcoal/wood burning tray. In some embodiments, the grilling chamber is used just for capturing and maintaining the heat generated by the lit charcoal or wood. The walls of the grilling chamber also have one or more ventilation ports for assisting the combustion of the burning charcoal or wood. Limiting the number of times the top lid 405 to the grill chamber is opened results in improved heating of the lower oven chamber.

Figure 6:
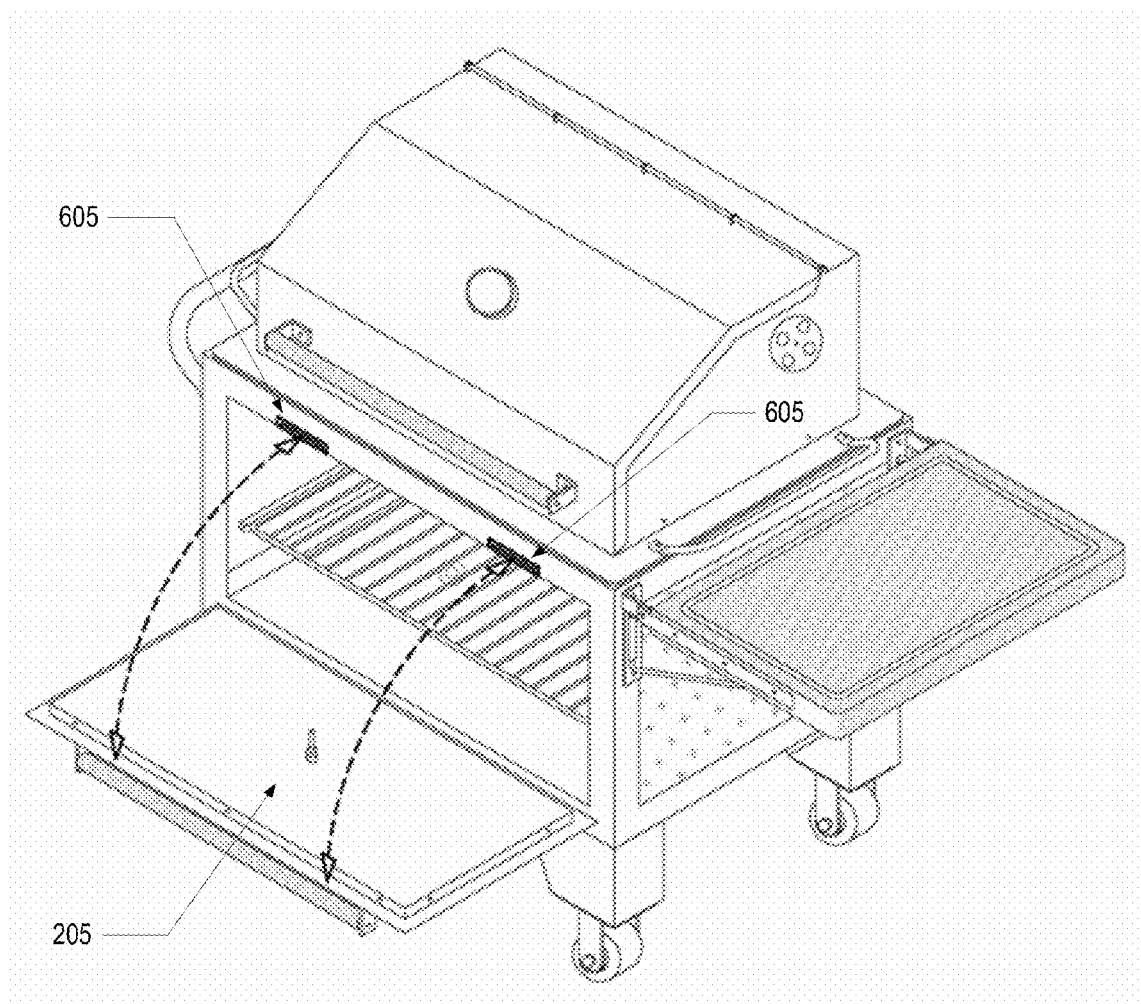
FIG. 6 is an isometric illustration of the outdoor charcoal/wood oven/grill with magnets for securing the front access panel, in accordance with some embodiments.

FIG. 6 is an isometric illustration of the outdoor charcoal/wood oven/grill with magnets for securing the front access panel, in accordance with some embodiments.

In some embodiments, the front access panel 205 is attached securely to one or more magnets 605 integrated with the frame of the oven chamber portion of the oven/grill. The magnets 605 help to insure that the front access panel 205 is not inadvertently opened and also help in thermally sealing the oven chamber.

Figure 7:
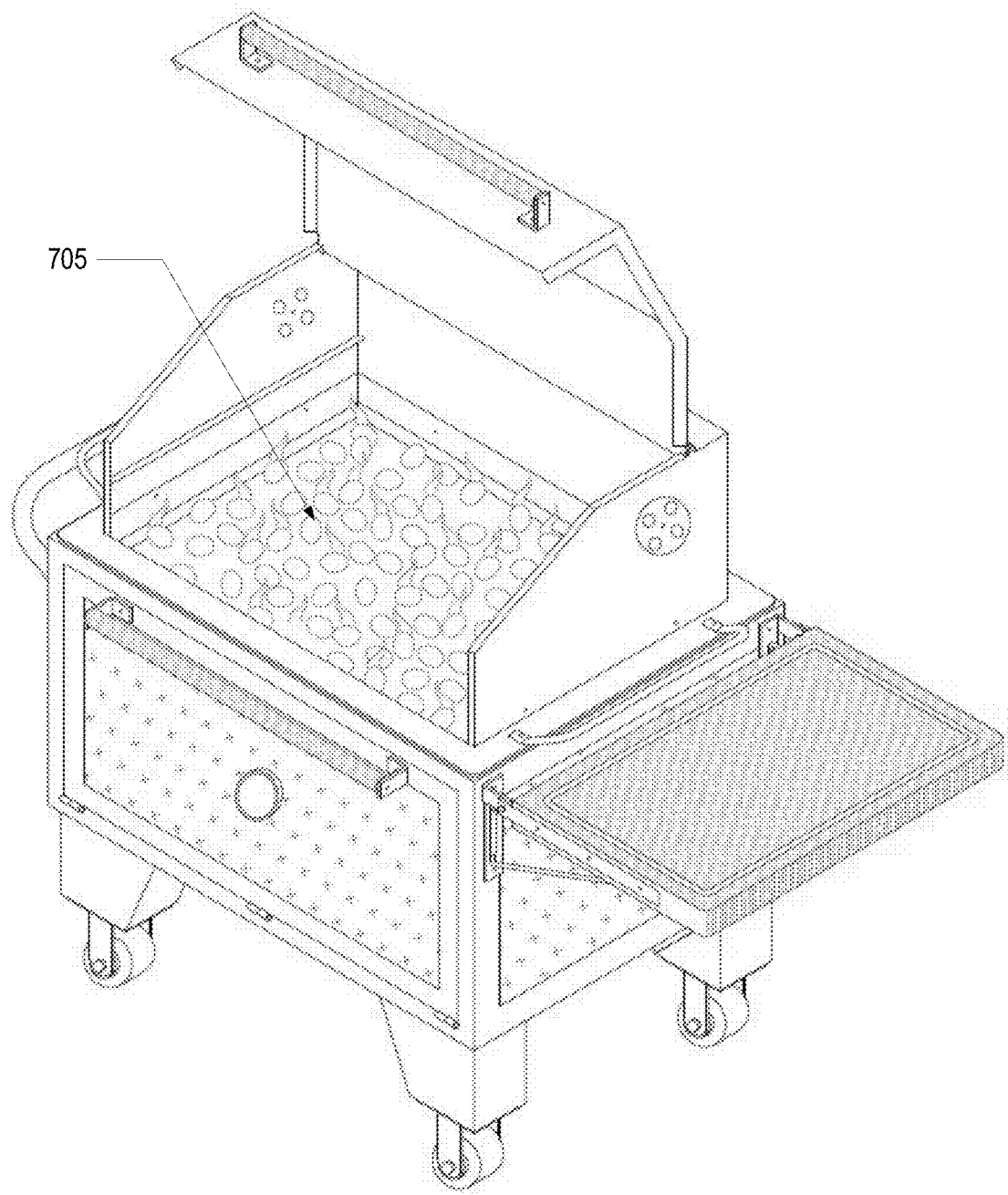
FIG. 7 is an isometric illustration of the outdoor charcoal/wood oven/grill with the top cover to the grill in the open position with lit charcoals in the charcoal tray, in accordance with some embodiments.

FIG. 7 is an isometric illustration of the outdoor charcoal/wood oven/grill with the top cover to the grill in the open position with lit charcoals in the charcoal tray, in accordance with some embodiments.

In some embodiments, the charcoals 705 in the charcoal/wood burning tray may be lit while the grilling chamber is still installed. Alternatively, the charcoals 705 may also be lit and the oven operated without using the grilling chamber.

Figure 8:
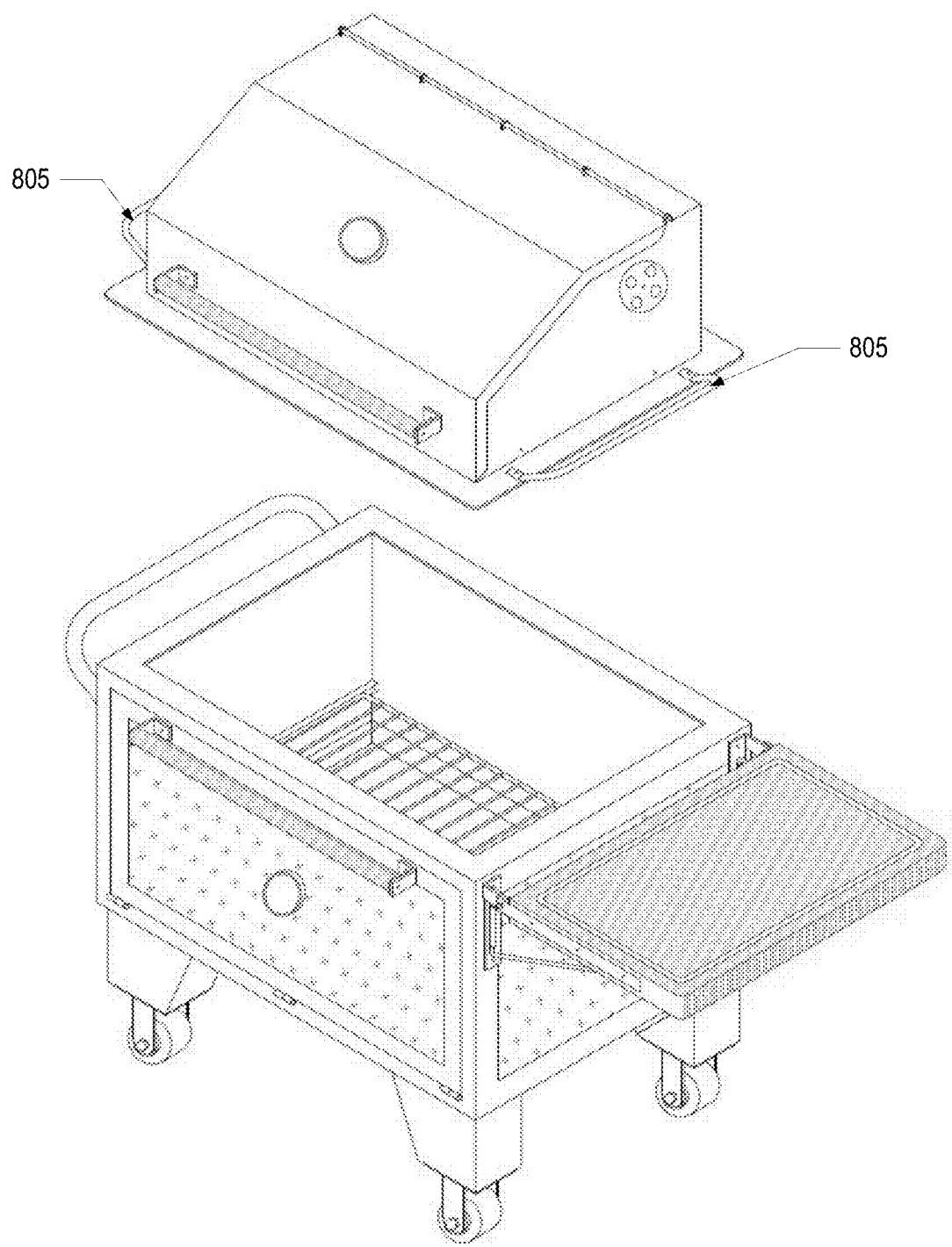
FIG. 8 is an isometric illustration of the outdoor charcoal/wood oven/grill with the grill portion and charcoal tray separated from the oven portion, in accordance with some embodiments.

FIG. 8 is an isometric illustration of the outdoor charcoal/wood oven/grill with the grill portion and charcoal tray separated from the oven portion, in accordance with some embodiments.

In some embodiments, the charcoal/wood burning tray along with the grilling chamber may be removed and separated from the oven chamber by simply using the handles 805 of the charcoal/wood burning tray and lifting the charcoal/wood burning tray along with the grilling chamber up from the oven chamber.

FIGS. 9A and B are isometric illustrations of the grill portion attached to the charcoal/wood burning tray with the top cover in the open position and with the top cover in the closed position, respectively, in accordance with some embodiments.

In some embodiments, the charcoal/wood burning tray along with the grilling chamber may be used as a conventional outdoor grill separate from the oven chamber portion. In such an embodiment, the grilling chamber attached to the charcoal/wood burning tray may be mounted on either the ground, concrete table, or some other non-combustible surface.

FIG. 10 is an exploded isometric illustration of the outdoor charcoal/wood oven/grill with the grill portion, the charcoal/wood burning tray, and the oven portion all separated from each other, in accordance with some embodiments.

In some embodiments, the grilling chamber 105, the charcoal/wood burning tray 115, and the oven chamber 110 are simply stacked on top of each other. Thus they can quickly and easily be separated for cleaning, storage, and transportation.

FIG. 11 is a cross-cut illustration of the outdoor charcoal/wood oven/grill with lit charcoals in the charcoal/wood burning tray, food on the grill grate, and food on the oven grate, in accordance with some embodiments.

In some embodiments, the charcoals 705 provide direct heat to the grill food items 1105 on top of the grill grate 410 of the grilling chamber 105 and radiant heat to the oven food items 1110 on top of the oven grate 305 of the oven chamber 110.

FIGS. 12A and B are isometric illustrations of the outdoor charcoal/wood oven/grill with an installed A/C powered rotisserie accessory in the grill portion with the top cover in the open position and with the top cover in the closed position, respectively, in accordance with some embodiments.

In some embodiments, an A/C powered rotisserie 1205 is optionally installed to the grilling chamber. The A/C powered rotisserie 1205 allows the uniform grilling of the food item by continuously rotating the food item about the long axis of the rotisserie. The A/C powered rotisserie 1205 may be operated with the top cover either in the open or closed position.

FIGS. 13A and B are isometric illustrations of the outdoor charcoal/wood oven/grill with an installed D/C powered rotisserie accessory in the grill portion with the top cover in the open position and with the top cover in the closed position, respectively, in accordance with some embodiments.

In some embodiments, a D/C powered rotisserie 1305 is optionally installed to the grilling chamber. The D/C powered rotisserie 1305 allows the uniform grilling of the food item by continuously rotating the food item about the long axis of the rotisserie. The D/C powered rotisserie 1305 may be operated with the top cover either in the open or closed position.

FIGS. 14A and B are isometric illustrations of the outdoor charcoal/wood oven/grill with an installed A/C powered air blower accessory attached to the grill portion with the top cover in the open position and with the top cover in the closed position, respectively, in accordance with some embodiments.

In some embodiments, an A/C powered air blower accessory 1405 is optionally installed to the grilling chamber to facilitate the combustion of the charcoal or wood in the charcoal/wood burning tray. The air blower accessory 1405 allows for the quick and uniform lighting of the charcoal or wood by drawing air from the outside and forcing it over the charcoal or wood.

FIGS. 15A and B are isometric illustrations of the outdoor charcoal/wood oven/grill with an installed D/C powered air blower accessory attached to the grill portion with the top cover in the open position and with the top cover in the closed position, respectively, in accordance with some embodiments.

In some embodiments, a D/C powered air blower accessory 1505 is optionally installed to the grilling chamber to facilitate the combustion of the charcoal or wood in the charcoal/wood burning tray. The air blower accessory 1505 allows for the quick and uniform lighting of the charcoal or wood by drawing air from the outside and forcing it over the charcoal or wood and out the one or more vent openings 1510 of the grilling chamber. Having such an air intake and ventilation system assists in the combustion of the burning charcoal or wood without having to open the lid to the grilling chamber.

FIG. 16 is an isometric illustration of the outdoor charcoal/wood oven/grill with the charcoal/wood burning tray and grill portion sitting on a support frame, in accordance with some embodiments.

In some embodiments, the charcoal/wood burning tray along with the grilling chamber may be separated from the oven chamber and mounted onto another separate table 1605. In such embodiments, the charcoal/wood burning tray along with the grilling chamber may be used as a conventional outdoor grill separate from the oven chamber portion.

FIG. 17 is an isometric illustration of the outdoor charcoal/wood oven/grill with the charcoal/wood burning tray and grill portion sitting on a collapsible and portable support frame, in accordance with some embodiments.

In some embodiments, the charcoal/wood burning tray along with the grilling chamber may be separated from the oven chamber and mounted onto another collapsible and portable support frame 1705. In some embodiments, the charcoal/wood burning tray along with the grilling chamber may be used as a portable and transportable outdoor grill separate from the oven chamber portion.

FIG. 18 is an exploded isometric illustration of the outdoor charcoal/wood oven/grill with the charcoal/wood burning tray and grill portion and a collapsible and portable support frame, in accordance with some embodiments.

In some embodiments, the collapsible and portable support frame 1705 may be disassembled and separated from the charcoal/wood burning tray and grill portion to provide portability and transportability the grill portion of the oven/grill. The collapsible and portable support frame 1705 comprises a top supporting frame 1805 and two leg supports 1810.

FIG. 19 is an isometric illustration of the outdoor charcoal/wood oven/grill with an installed D/C powered rotisserie accessory in the oven portion with the front access panel of the oven in the open position, in accordance with some embodiments.

In some embodiments, the versatile outdoor charcoal or wood oven and grill comprises an A/C or D/C powered rotisserie 1905 installed to the oven chamber. The A/C or D/C powered rotisserie 1905 allows the uniform radiant heating of the food item by continuously rotating the food item about the long axis of the rotisserie. The rotisserie 1905 comprises one or more adjustable forks 1910 that ensure that food placed on the rotisserie actually rotates with the rotisserie.

FIG. 20 is an isometric illustration of the outdoor charcoal/wood oven/grill showing the cross-sectional cut of one of the walls of the oven, in accordance with some embodiments.

In some embodiments, the versatile outdoor charcoal or wood oven and grill comprises insulated walls comprising a middle insulation layer 2005 having an R-value between 4 and 6. In one embodiment, the middle insulation layer comprises a ¾" thick thermal insulation board composed of a closed-cell polyisocyanurate (polyiso) foam bonded to a durable white matte non-glare aluminum face. One such commercially available foam board is R-Max Plus-3. The interior of the oven has an interior metal plate 2010 adjacent to the middle insulation layer 2005. In some embodiments, the interior metal plate 2010 is made from stainless steel sheet or plate such as No. 22 gauge stainless steel with a 430-BA finish. The exterior of the oven has an exterior metal plate 2015 adjacent to the other side of the middle insulation layer 2005 opposite the interior metal plate 2010. In some embodiments, the exterior metal plate 2015 is made from aluminum sheet or plate such as No. 16 gauge aluminum diamond plate. Insulating the side walls and bottom of the oven/grill provides for a substantially constant interior oven/grill temperature for many hours. In such an environment, the food that is being roasted in the oven chamber is able to be uniformly slowed cooked resulting in more tender and juicy food.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

The invention claimed is:

1. An apparatus for outdoor cooking comprising:
a charcoal/wood burning tray comprising a perimeter surface and a recessed well wherein the recessed well is configured to receive a fuel source;
a substantially rectangular prism oven chamber comprising:
an insulated bottom plate;
four insulated side walls coupled to the insulated bottom plate, wherein the four insulated side walls are non-vented; and
an opening opposite the insulated bottom plate; and
a grilling cover removeably mounted to the perimeter surface of the charcoal/wood burning tray, wherein the grilling cover comprises:
a back wall;
two side walls coupled to the back wall, wherein at least one of the side walls has at least one or more vent openings;
a grill gate removeably coupled to the two side walls;
a lid hinged to the back wall;
an integrated rotisserie coupled through at least one of the side walls; and
an air blower coupled through at least one of the side walls;
wherein the perimeter surface of the charcoal/wood burning tray is configured to rest on the edges of the four insulated side walls and the recessed well of the charcoal/wood burning tray drops down into the substantially rectangular prism oven chamber;
wherein the substantially rectangular prism oven chamber is configured to receive food to be cooked;
wherein the charcoal/wood burning tray completely covers and is removably mounted to the opening of the substantially rectangular prism oven chamber opposite the insulated bottom plate of the substantially rectangular prism oven chamber; and
wherein during the combustion of the fuel source, the charcoal/wood burning tray provides indirect radiant heat into the substantially rectangular prism oven chamber.

2. The apparatus of claim 1, wherein the substantially rectangular prism oven chamber further comprises an access panel formed from a portion of one of the insulated side walls, wherein the access panel is hinged along an edge of the substantially rectangular prism oven chamber between one of the insulated side walls and the insulated bottom plate.

3. The apparatus of claim 2, wherein the substantially rectangular prism oven chamber further comprises one or more magnets configured to keep the access panel closed.

4. The apparatus of claim 1, wherein the charcoal/wood burning tray comprises steel or copper encased within steel.

5. The apparatus of claim 1, wherein the charcoal/wood burning tray is blackened or painted black.

6. The apparatus of claim 1, wherein the substantially rectangular prism oven chamber further comprises a grate disposed within the substantially rectangular prism oven chamber.

7. The apparatus of claim 1, wherein the substantially rectangular prism oven chamber further comprises an integrated rotisserie coupled through at least one of the four insulated side walls.

8. The apparatus of claim 1, wherein the insulated bottom plate comprises:
a stainless steel plate;
an insulation layer coupled to the stainless steel plate; and
an aluminum plate coupled to the insulation layer;
wherein the stainless steel plate faces the interior of the substantially rectangular prism oven chamber.

9. The apparatus of claim 8, wherein the insulation layer comprises an R-value between about 4 to about 6.

10. The apparatus of claim 8, wherein the insulation layer comprises a closed-cell polyisocyanurate foam bonded to a white matte non-glare aluminum face.

11. The apparatus of claim 1, wherein the insulated bottom plate further comprises a valve coupled through the insulated bottom plate.

12. The apparatus of claim 1, wherein the four insulated side walls comprise:
a stainless steel plate;
an insulation layer coupled to the stainless steel plate; and
an aluminum plate coupled to the insulation layer;
wherein the stainless steel plate faces the interior of the substantially rectangular prism oven chamber.

13. The apparatus of claim 12, wherein the insulation layer comprises an R-value between about 4 to about 6.

14. The apparatus of claim 12, wherein the insulation layer comprises a closed-cell polyisocyanurate foam bonded to a white matte non-glare aluminum face.

15. The apparatus of claim 1, wherein the substantially rectangular prism oven chamber further comprises an oven thermometer coupled through one of the four insulated side walls.

16. The apparatus of claim 1, further comprising four legs coupled to each corner of the substantially rectangular prism oven chamber on the side of the insulated bottom plate.

17. The apparatus of claim 16, further comprising four wheels coupled to the four legs opposite each corner of the substantially rectangular prism oven chamber.

18. The apparatus of claim 17, wherein at least two of the four wheels comprise rotating casters and wherein at least one of the four wheels comprises a brake.

19. An apparatus for outdoor cooking comprising:
   a charcoal/wood burning tray comprising a perimeter surface and a recessed well wherein the recessed well is configured to receive a fuel source, wherein the charcoal/wood burning tray comprises blackened steel or black painted steel;
   a substantially rectangular prism oven chamber comprising:
      an insulated bottom plate, wherein the insulated bottom plate comprises:
         a bottom stainless steel plate, wherein the bottom stainless steel plate faces the interior of the substantially rectangular prism oven chamber;
         a bottom insulation layer coupled to the bottom stainless steel plate;
         a bottom aluminum plate coupled to the bottom insulation layer; and
         a valve coupled through the insulated bottom plate;
      four insulated side walls coupled to the insulated bottom plate, wherein the four insulated side walls are non-vented, and wherein the four insulated side walls comprise:
         a wall stainless steel plate, wherein the wall stainless steel plate faces the interior of the substantially rectangular prism oven chamber;
         a wall insulation layer coupled to the wall stainless steel plate; and
         a wall aluminum plate coupled to the wall insulation layer;
      an opening opposite the insulated bottom plate;
      an access panel formed from a portion of one of the insulated side walls, wherein the access panel is hinged along an edge of the substantially rectangular prism oven chamber between one of the insulated side walls and the insulated bottom plate;
      one or more magnets configured to keep the access panel closed;
      a grate disposed within the substantially rectangular prism oven chamber; and
      an oven thermometer coupled through one of the four insulated side walls;
   a grilling cover removably mounted to the perimeter surface of the charcoal/wood burning tray, wherein the grilling cover comprises:
      a back wall;
      two side walls coupled to the back wall, wherein at least one of the side walls has at least one or more vent openings;
      a grill grate removably coupled to the two side walls; and
      a lid hinged to the back wall;
   four legs coupled to each corner of the substantially rectangular prism oven chamber on the side of the insulated bottom plate; and
   four wheels coupled to the four legs opposite each corner of the substantially rectangular prism oven chamber, wherein at least two of the four wheels comprise rotating casters and wherein at least one of the four wheels comprises a brake;
   wherein the perimeter surface of the charcoal/wood burning tray is configured to rest on the edges of the four insulated side walls and the recessed well of the charcoal/wood burning tray drops down into the substantially rectangular prism oven chamber;
   wherein the substantially rectangular prism oven chamber is configured to receive food to be cooked;
   wherein the charcoal/wood burning tray completely covers and is removably mounted to the opening of the substantially rectangular prism oven chamber opposite the insulated bottom plate of the substantially rectangular prism oven chamber; and
   wherein during the combustion of the fuel source, the charcoal/wood burning tray provides indirect radiant heat into the substantially rectangular prism oven chamber.

* * * * *